(12) United States Patent
Jeong et al.

(10) Patent No.: US 8,436,876 B2
(45) Date of Patent: May 7, 2013

(54) BACKLIGHT UNIT WITH CONTROLLERS OF AIR AND FLUID AND DISPLAY DEVICE HAVING THE SAME USING TWO DIFFERENT LIGHTS

(71) Applicant: LG Display Co., Ltd., Seoul (KR)

(72) Inventors: Ho Young Jeong, Gunpo-si (KR); Deuk Su Lee, Yongin-si (KR); Jun Hyeok Yu, Seoul (KR); Jae Jung Han, Seoul (KR); Mi Young Do, Suwon-si (KR); Tae Han Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/654,542

(22) Filed: Oct. 18, 2012

(65) Prior Publication Data

US 2013/0044464 A1 Feb. 21, 2013

Related U.S. Application Data

(62) Division of application No. 12/003,421, filed on Dec. 26, 2007, now Pat. No. 8,305,515.

(30) Foreign Application Priority Data

| Feb. 16, 2007 | (KR) | ......................... 10-2007-0016654 |
| Mar. 20, 2007 | (KR) | ......................... 10-2007-0027028 |
| Mar. 22, 2007 | (KR) | ......................... 10-2007-0027891 |

(51) Int. Cl.
*G02F 1/1335* (2006.01)
*F21V 7/04* (2006.01)

(52) U.S. Cl.
USPC ................... 346/61; 349/62; 349/63; 349/65; 349/66; 349/67; 349/68; 349/69; 349/70; 362/611; 362/612; 362/623; 362/614; 362/615

(58) Field of Classification Search ............... 349/61–62, 349/64–65; 362/543–545, 611–615
See application file for complete search history.

(56) References Cited

U.S. PATENT DOCUMENTS

| 7,085,444 B2 * | 8/2006 | Bermel et al. ................... 385/16 |
| 7,110,062 B1 | 9/2006 | Whitted et al. |
| 7,538,834 B2 | 5/2009 | Onishi et al. |
| 8,075,982 B2 * | 12/2011 | Donahue ..................... 428/195.1 |
| 2003/0231483 A1 | 12/2003 | Higashiyama |
| 2003/0234897 A1 | 12/2003 | Ozawa |
| 2005/0073627 A1 | 4/2005 | Akiyama |
| 2005/0099669 A1 * | 5/2005 | Kowarz et al. ................. 359/291 |

OTHER PUBLICATIONS

KR Office Action issued Feb. 18, 2013.

* cited by examiner

*Primary Examiner* — Hoan C Nguyen
(74) *Attorney, Agent, or Firm* — Morgan, Lewis & Bockius LLP

(57) ABSTRACT

Provided are a backlight unit and a display device having the same. The backlight unit includes a case having an opening, at least one lamp assembly disposed on a side surface of the case and including a light source, an optical transreflective unit on the case, the optical transreflective unit transmitting a portion of first light passing through the opening and reflecting a portion of second light generated from the light source, and an optical sheet including a first diffusion unit on the optical transreflective unit.

10 Claims, 16 Drawing Sheets

BACKLIGHT UNIT WITH CONTROLLERS OF AIR AND FLUID AND DISPLAY DEVICE HAVING THE SAME USING TWO DIFFERENT LIGHTS

CROSS-REFERENCE TO RELATED APPLICATIONS

This application is a divisional patent application derived from the patent application Ser. No. 12/003,421 filed on Dec. 26, 2007, now allowed, which claims priority under 35 USC §119 and 35 U.S.C. §365 to Korean Patent Application No. 10-2007-0016654 filed on Feb. 16, 2007, Korean Patent Application No. 10-2007-0027028 filed on Mar. 20, 2007, and Korean Patent Application No. 10-2007-0027891 filed on Mar. 22, 2007, which is hereby incorporated by references in its entirety.

BACKGROUND

The present disclosure relates to a backlight unit, and more particularly, to a backlight unit capable of improving optical efficiency, and a display device having the same.

Recently, various display devices are being developed to meet user's information requirements. Display devices include, for example, liquid crystal display devices, plasma display devices, organic electro-luminescent display devices and field emission display devices.

Among such display devices, liquid crystal display (LCD) devices, which display an image using liquid crystals, are being widely used throughout industry thanks to their several advantages such as slimness, lightness, low power consumption and low driving voltage.

The LCD device includes two substrates and liquid crystals interposed therebetween. A voltage applied across the two substrates controls orientation of the liquid crystals so that the LCD device displays an image.

The LCD device needs a backlight unit for irradiating light from the outside because the LCD device is a passive device that cannot emit light by itself.

However, a light source must be continuously operated because a related art backlight unit has to generate light in order for the LCD device to display an image, thus leading to an increase in power consumption.

Moreover, it is difficult for the related art backlight unit to provide brightness level beyond predetermined value due to a technical limitation and an increase in power consumption.

In order to improve optical efficiency, therefore, studies are being actively conducted on technologies for substituting a light source of a backlight unit lately.

SUMMARY

Accordingly, the present invention is directed to a liquid crystal display device that substantially obviates one or more of the problems due to limitations and disadvantages of the related art.

Embodiments provide a backlight unit, which is capable of improving optical efficiency using natural light as well as artificial light, and a display device having the same.

Embodiments also provide a backlight unit, which is capable of improving optical efficiency using artificial light and natural light depending on brightness condition of surroundings, and a display device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a backlight includes: a case having an opening; at least one lamp assembly on a side surface of the case, the at least one lamp assembly including a light source; an optical transreflective unit on the case, the optical transreflective unit transmitting a portion of first light passing through the opening and reflecting a portion of second light generated from the light source; and an optical sheet including a first diffusion unit on the optical transreflective unit.

In another embodiment, a backlight unit includes: a case having an opening; at least one lamp assembly on a side surface of the case, the at least one lamp assembly including a light source; a diffusion unit on the case; a cover on the diffusion unit for forming an internal space in the diffusion unit; a first controller controlling air to be supplied into the internal space; and a second controller controlling fluid to be supplied into the internal space.

In a further embodiment, a display device includes: a display panel; and a backlight unit providing light to the display panel. Herein, the backlight unit includes: a first case having an opening; at least one lamp assembly on a side surface of the first case, the at least one lamp assembly including a light source; an optical transreflective unit on the first case, the optical transreflective unit transmitting a portion of first light passing through the opening and reflecting a portion of second light generated from the light source; and an optical sheet including a first diffusion unit on the optical transreflective unit.

In a still further embodiment, a display device includes: a display panel; and a backlight unit providing light to the display panel. Herein, the backlight unit includes: a first case having an opening; at least one lamp assembly on a side surface of the first case, the at least one lamp assembly including a light source; a diffusion unit on the first case; a cover on the diffusion unit for forming an internal space in the diffusion unit; a first controller controlling air to be supplied into the internal space; and a second controller controlling fluid to be supplied into the internal space.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE EMBODIMENTS

Reference will now be made in detail to the embodiments of the present disclosure, examples of which are illustrated in the accompanying drawings.

Figure 1:
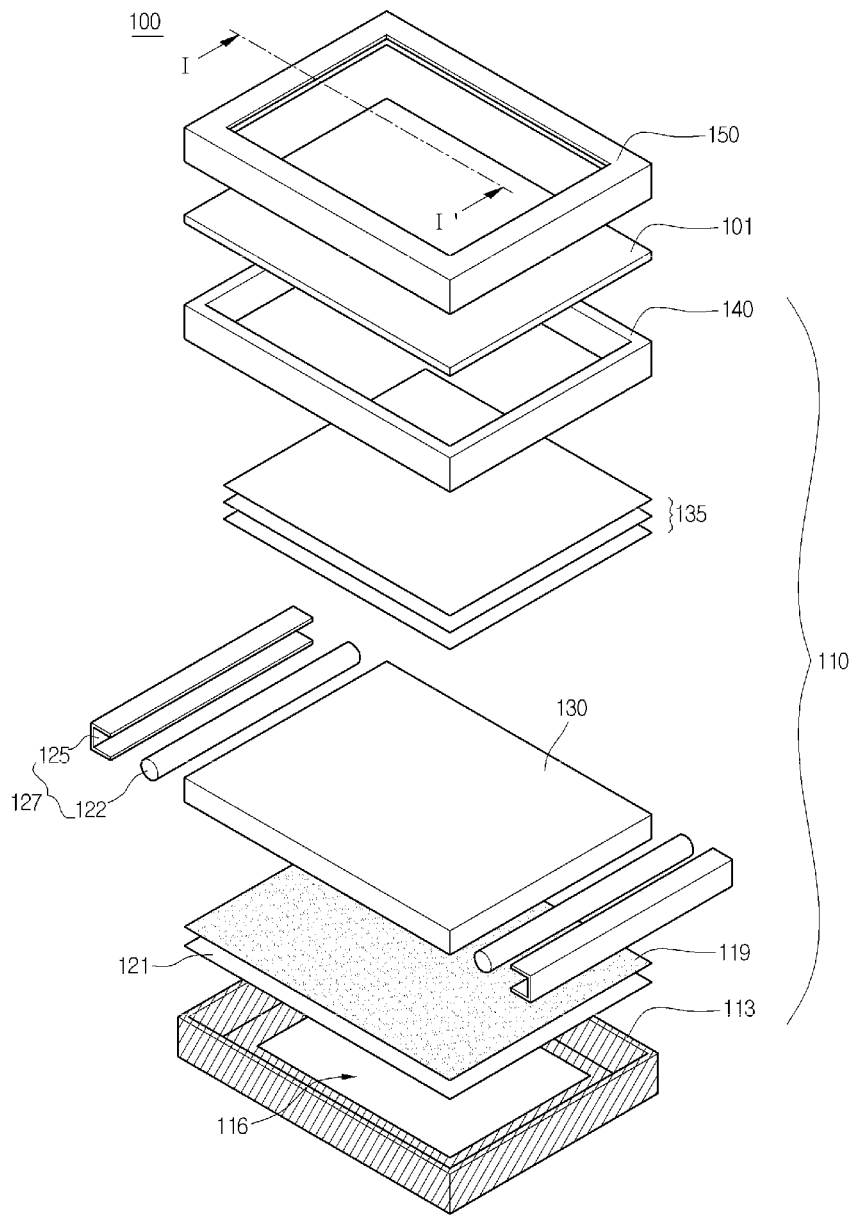
FIG. 1 is an exploded perspective view of a display device according to an embodiment.
Figure 2:
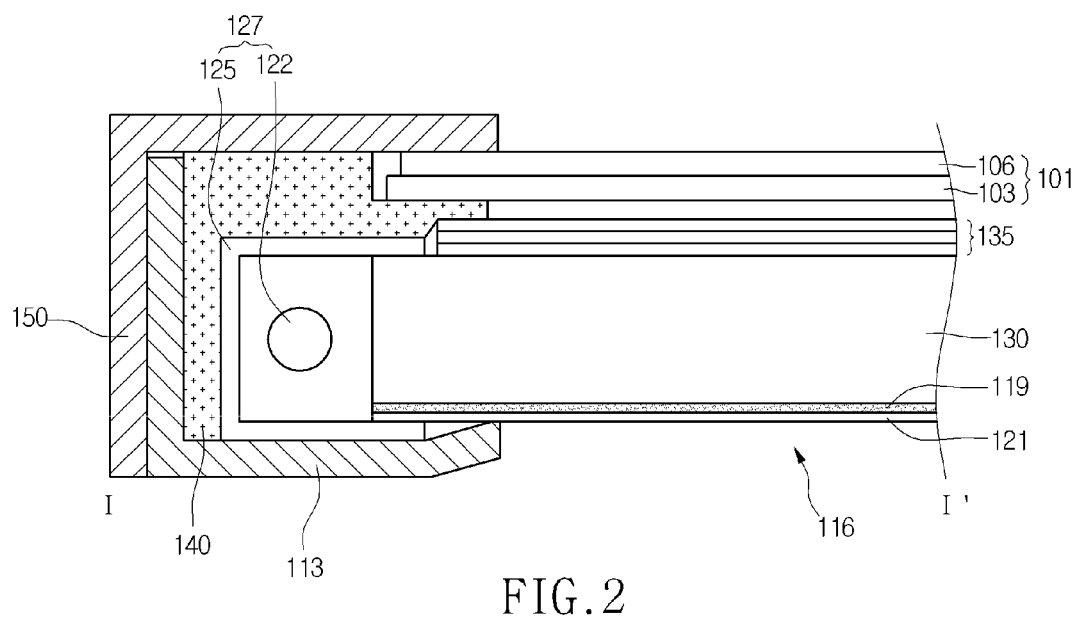
FIG. 2 is a sectional view taken along line 1-1' of FIG. 1.

FIG. 1 is an exploded perspective view of a display device 100 according to an embodiment. FIG. 2 is a sectional view taken along line 1-1' of FIG. 1.

Referring to FIGS. 1 and 2, the display device 100 includes a display panel 101 configured to display an image, a backlight unit 110 configured to provide external light (hereinafter, referred to as 'first light') or internal light (hereinafter, referred to as 'second light') to the display panel 101, and a top case 150 configured to fix the display panel 101. The first light may include, for example, natural light provided from the sun or light provided from an artificial light source such as an illuminator.

The backlight unit 110 includes a lamp assembly 127, a light guide plate 130, an optical reflective-transmissive unit 119 (hereinafter, referred to as 'optical transreflective unit 119' for simplicity), an optical sheet 135, a support main 140 and a bottom case 113 so as to provide the second light to the display panel 101.

The lamp assembly 127 includes a lamp 122 and a lamp cover 125. The lamp 122 is disposed at one side of the light guide plate 130 and emits the second light. The lamp cover 125 is disposed to surround the lamp 122 to reflect the second light emitted from the lamp 122.

The lamp 122 may include, for example, at least one of a cold cathode fluorescence lamp (CCFL), an external electrode fluorescent lamp (EEFL) and a light emitting diode (LED) array board with a plurality of LEDs.

The light guide plate 130 is disposed on the same plane with the lamp assembly 127 to provide the second light of the lamp 122 upwardly. The second light emitted from the lamp 122 is directly provided to the light guide plate 130 or provided to the light guide plate 130 after being reflected by the lamp cover 125. The light guide plate 130 then provides the second light upwardly. The light guide plate 130 may be formed of poly methyl metharylate acrylate (PMMA). The light guide plate 130 may have the shape of a wedge gradually decreasing in thickness away from the lamp 122 or may have the shape of a plate with a constant thickness. A plurality of patterns may be disposed on a rear surface of the light guide plate 130 so as to refract the second light or the first light.

Although it is illustrated that the lamp assembly 127 is disposed at one side of the light guide plate 130, the lamp assembly 127 may be disposed at two opposite sides, three sides or all the sides of the light guide plate 130.

The optical transreflective unit 119 may be disposed on the rear surface of the light guide plate 130. For examples, the optical transreflective unit 119 may include at least one of an optical efficiency enhancement film, a diffusion sheet and a prism sheet. On a rear surface of the optical transreflective unit 119, a transparent protective film is further provided so as to protect the optical transreflective unit 119 from external foreign substances and to support the optical transreflective unit 119. The transparent protective film may include, for example, a plastic substrate or a glass substrate.

For instance, the optical efficiency enhancement film may include at least one of a dual brightness enhancement film (DBEF) and a brightness enhancement film (BEF). The optical efficiency enhancing film transmits the first light but reflects the second light emitted from the lamp 122.

The diffusion sheet may include, for example, at least one of acryl, polycarbonate and polyester. The diffusion sheet diffuses the second light or the first light for achieving uniform distribution, and can also reflect a portion of the second or first light incident on the diffusion sheet. The prism sheet controls a propagation direction of light. For example, the prism sheet may have prism peaks on one side thereof.

The optical transreflective unit 119 may include an optical efficiency enhancement film. Alternatively, the optical transreflective unit 119 may include an optical efficiency enhancement film and a diffusion sheet disposed on the optical efficiency enhancement film. Further alternatively, the optical transreflective unit 119 may include an optical efficiency enhancement film and a prism sheet disposed on the optical efficiency enhancement film. The optical transreflective unit 119 reflects the second light forwardly or transmits the first light. The prism sheet prevents the second light from being randomly reflected and thus condenses the second light, which makes it possible to improve brightness.

The optical transreflective unit 119 may selectively transmit or reflect the second light or the first light depending on the intensity of the second or first light.

For example, when the intensity of the second light emitted from the lamp 122 is greater than that of the first light passing through an opening 116 of the bottom case 113, the second light is reflected by the optical transreflective unit 119 so that it is provided to the display panel 101.

On the contrary, when the intensity of the first light passing through the opening 116 of the bottom case 113 is greater than that of the second light emitted from the lamp 122, the first light, i.e., the external light, is transmitted by the optical transreflective unit 119 so that it is provided to the display panel 101.

The optical sheet 135 diffuses and condenses the second light or the first light provided from the light guide plate 130. The optical sheet 135 may include a diffusion sheet, and first and second prism sheets.

The support main 140 supports the display panel 101 while fixing the optical sheet 135. The support main 140 may have the shape of a rectangular frame because it must support the display panel 101.

The bottom case 113, which receives the lamp assembly 127, the optical transreflective unit 119, the light guide plate 130 and the optical sheet 135, is coupled to the top case 150. To provide the first light to the display panel 101, the opening 116 is provided in the bottom case 113, allowing the first light to be incident onto the optical transreflective unit 119. Therefore, the first light may be provided to the display panel 101 through the opening 116 of the bottom case 113 via the optical transreflective unit 119, the light guide plate 130 and the optical sheet 135.

The lamp assembly 127 is fixedly coupled to the bottom case 113, and the optical transreflective unit 119, the light guide plate 130 and the optical sheet 135 are sequentially received in the bottom case 113.

Thereafter, the support main 140 is received in the bottom case 113, and fixedly coupled to the bottom case 113. The optical transreflective unit 119, the light guide plate 130 and the optical sheet 135 can be fixed by means of the support main 140.

After the support main 140 is placed on the display panel 101, the top case is fixedly coupled to the bottom case 113. Accordingly, the lamp assembly 127, the optical transreflective unit 119, the light guide plate 130, the optical sheet 135 and the display panel 101, which are disposed between the bottom case 113 and the top case 150, can be fixed.

The display panel 101 displays an image using the second light or the first light provided from the backlight unit 110. For instance, the display panel 101 may include a liquid crystal display panel.

The display panel 101 is divided into two areas, of which one is an active area for displaying an image and the other is a non-active area defined in a peripheral region of the active area.

The top case 150 is fixedly coupled to the bottom case 113 such that it surrounds the non-active area of the display panel 101.

The display panel 101 includes a first substrate 103 having a thin film transistor (TFT) array, a second substrate 106 having color filter patterns, and a liquid crystal layer interposed between the first and second substrates 103 and 106. In the display panel 101, a plurality of pixel regions are arranged in a matrix form in the active area. Each of the pixel regions includes a red pixel (R), a green pixel (G) and a blue pixel (B).

The first substrate 103 includes a plurality of gate lines and a plurality of data lines crossing each other.

Each of the pixel regions may be defined in every region where the gate lines cross the data lines. The pixel region includes at least one TFT and a pixel electrode connected to the TFT.

The second substrate 106 facing the first substrate 103 includes red, green and blue color filter patterns are provided, which correspond to the respective pixel regions defined in the first substrate 103. Further, the second substrate 106 includes light-blocking patterns corresponding to the gate line, the data line and the TFT, and a common electrode disposed on each of the color patterns and the light-blocking pattern.

Although not shown, a first polarization film may be disposed on an outer surface of the first substrate 103, and a second polarization film may be disposed on an outer surface of the second substrate 106.

Hence, a data voltage is supplied to the pixel electrode by switching operation of the TFT provided in each of the pixel regions, and a common voltage is supplied to the common electrode of the second substrate 106, so that an electric field is generated between the first and second substrates 103 and 106. This electric field leads to a change in orientations of liquid crystals of the liquid crystal layer to control the transmittance of the second or first light provided from the backlight unit 110, thus displaying a desired image.

The opening 116 of the bottom case 113 may have a size equal to or greater than that of the active area of the display panel 101. That is, the opening 116 of the bottom case 113 may be at least as great as the active area of the display panel 101. Accordingly, the first light can be provided to the active area of the display panel 101 through the opening 116 of the bottom case 113.

The display device 100 having the above configuration may be operated in various ways.

For instance, if the intensity of the first light is sufficient like daylight, the lamp 122 of the display device 100 is not used because it is powered off. In this case, only the first light passing through the opening 116 of the bottom case 113 may be used. The first light is provided to the display panel 101 via the optical transreflective unit 119, the light guide plate 130 and the optical sheet 135, so that the display panel 101 displays an image. In the case where the first light is not generated from the sun but generated from an illuminator, the illuminator may be disposed around the bottom case 113.

The display device 100 may be attached to a transparent support member (not shown). The support member may be a window of a building.

For example, if the intensity of the first light is not sufficient like a cloudy day or night, the lamp 122 of the display device 100 is powered on to emit light. Internal light emitted from the lamp 122 may be utilized in this case. The second light, i.e., the internal light, is provided forwardly by means of the light guide plate 150 and the optical transreflective unit 119 and then provided to the display panel 101 via the optical sheet 135, so that the display panel 101 displays an image.

The display device 100 having the above configuration is applicable to any display device displaying an image using the second light or the first light. Although the display device of this embodiment is limited to a twisted nematic (TN) mode liquid crystal panel, it is also applicable to an in-plane switching (IPS) mode display panel. In addition, the embodiment can be applied to a reflective or transreflective display panel.

Since the display device 100 of this embodiment is light-weight and slim and the backlight unit 120 is not always operated but selectively operated according to circumstances, the display device 100 can considerably reduce power consumption.

Figure 3A:
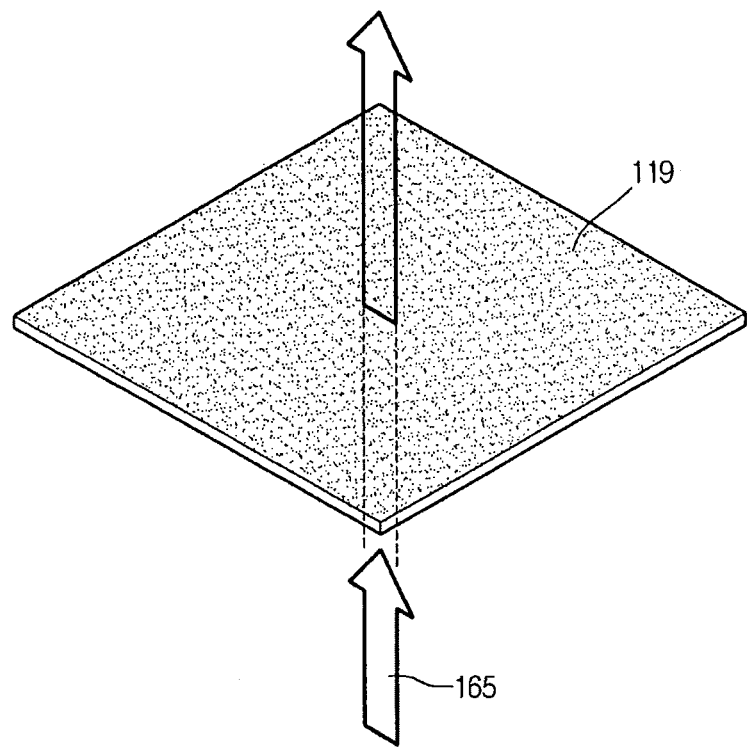
FIGS. 3A and 3B are perspective views illustrating characteristics of an optical transreflective unit.
Figure 3B:
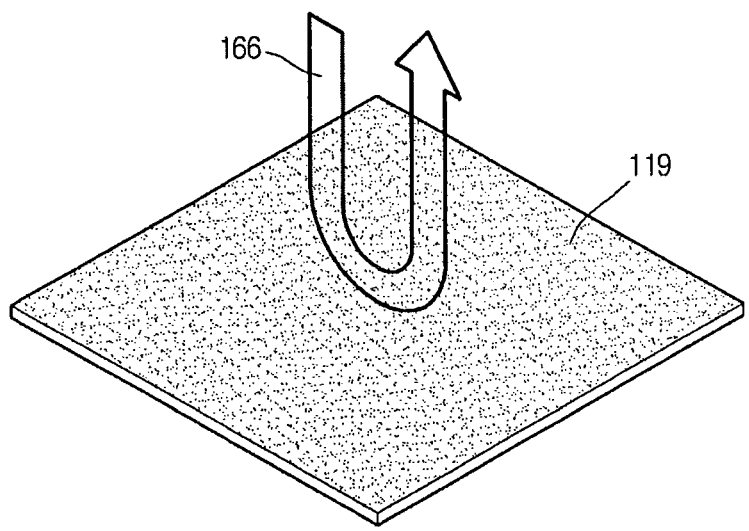

FIGS. 3A and 3B are perspective views illustrating characteristics of the optical transreflective unit 119.

Referring to FIG. 3A, the optical transreflective unit 119 transmits first light 165, which is incident on a first surface in a first direction, to a second surface. For example, in the case where the optical transreflective unit 119 has a multi-stacked structure of a diffusion sheet and an optical efficiency enhancement film, the first surface is a rear surface of the diffusion sheet and the second surface may be a top surface of the optical efficiency enhancement film. Alternatively, the first surface may be a rear surface of the optical efficiency enhancement film, and the second surface is a top surface of the diffusion sheet.

Referring to FIG. 3B, the optical transreflective unit 119 reflects second light 166, which is incident on a second surface in a second direction opposite to the first direction, toward a first surface. For example, in the case where the optical transreflective unit 119 has a multi-stacked structure of a diffusion sheet and an optical efficiency enhancement film, a portion of the second light 166 emitted from the lamp 122 is reflected by the optical efficiency enhancement film and the rest of the second light 166 is transmitted. The transmitted light is partially reflected by the diffusion sheet and then incident on the optical efficiency enhancement film. Through repeating such a procedure, most of the second light 166 incident on the optical transreflective unit 119 is reflected by the optical transreflective unit 119, and then incident onto the light guide plate 130.

Figure 4A:
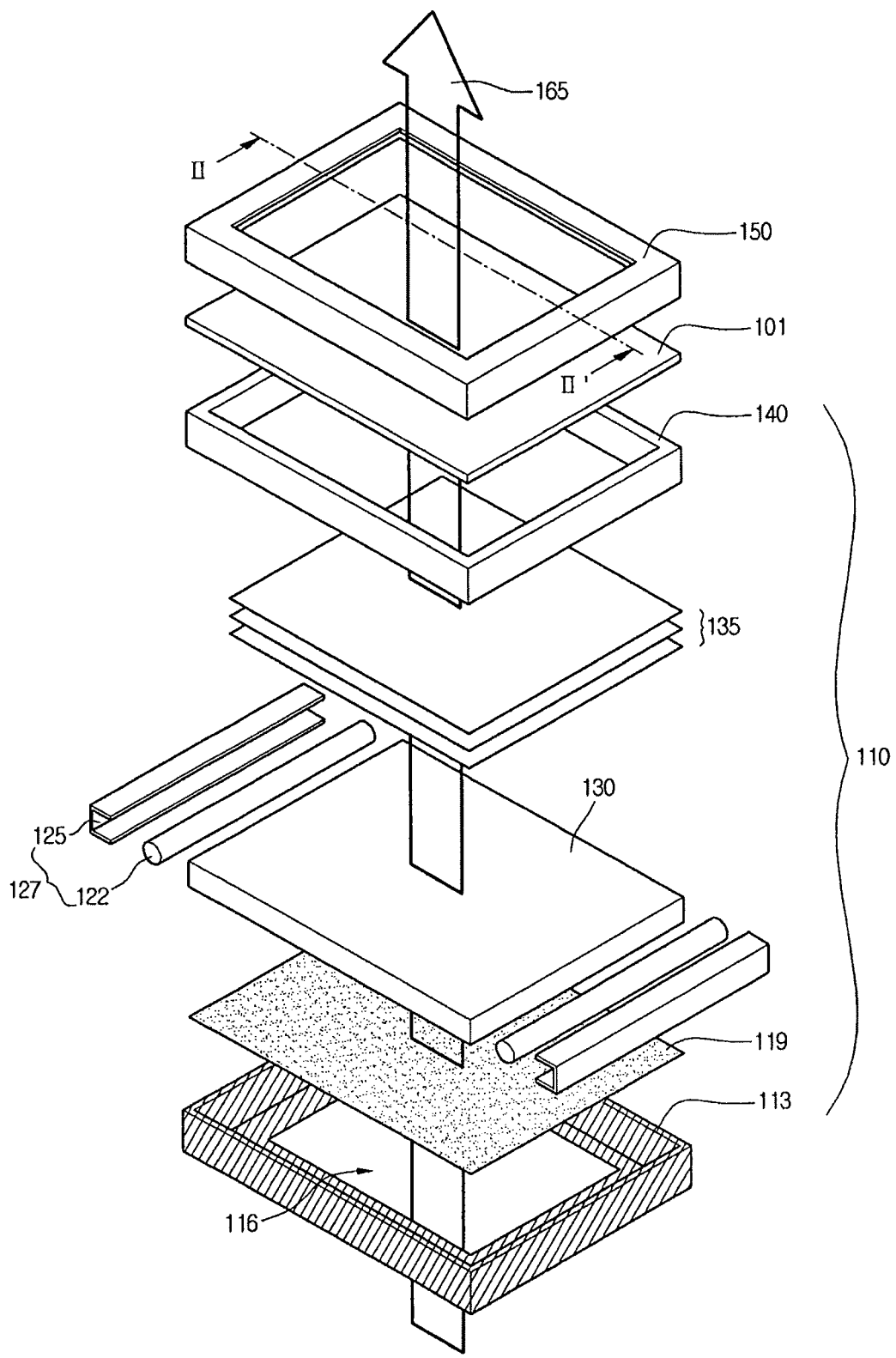
FIG. 4A is an exploded perspective view of a display device using first light.
Figure 4B:
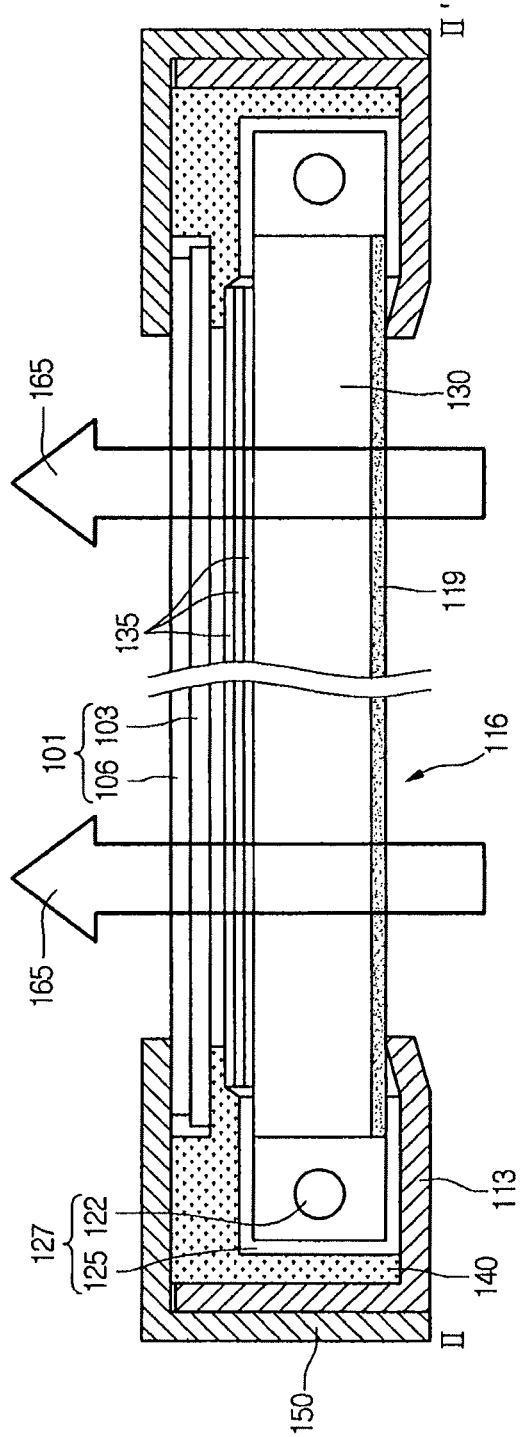
FIG. 4B is a sectional view taken along line II-II' of FIG. 4A.

FIG. 4A is an exploded perspective view of a display device using first light. FIG. 4B is a sectional view taken along line II-IP of FIG. 4A.

Referring to FIGS. 4A and 4B, the first light 165, which passes through the opening 116 of the bottom case 113, is provided to the display panel 101 via the optical transreflective unit 119, the light guide plate 130 and the optical sheet 135.

The transmittance of the first light 165 provided to the display panel 101 is changed while the first light 165 passes through the display panel 101, so that an image is displayed.

Figure 5A:
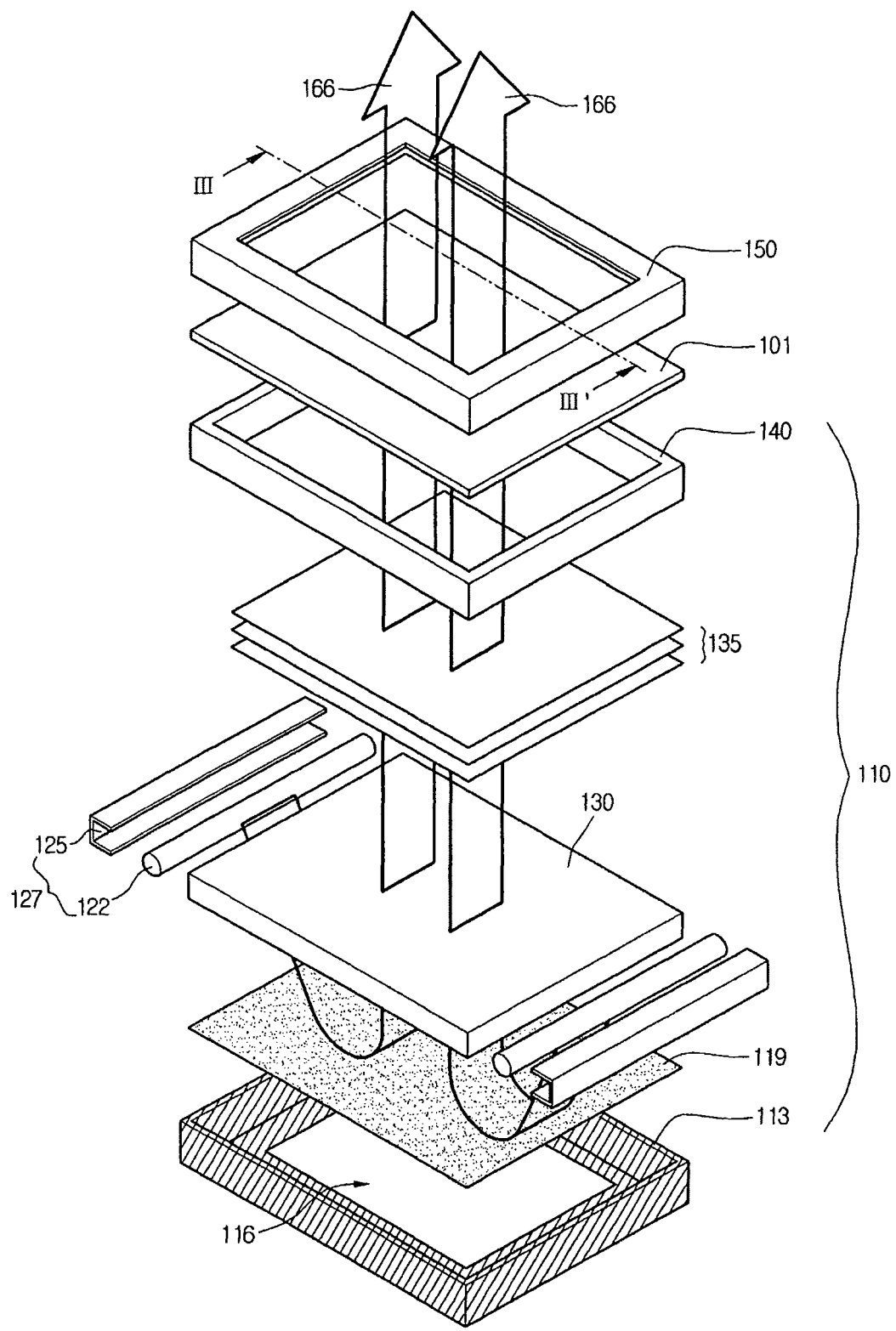
FIG. 5A is an exploded perspective view of a display device using second light.
Figure 5B:
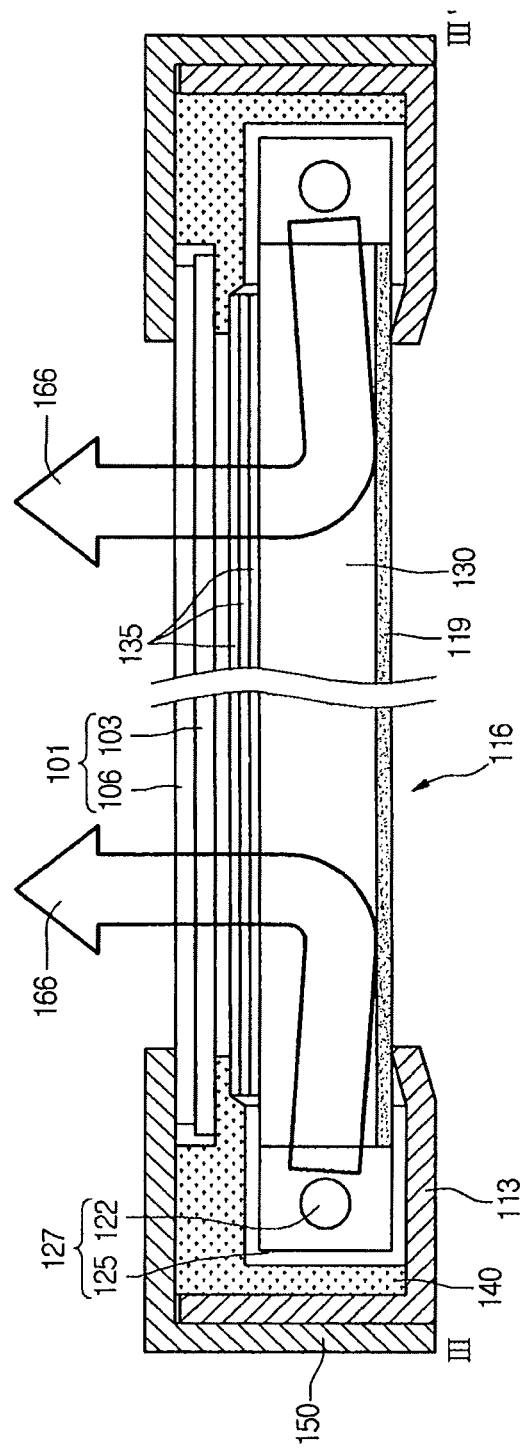
FIG. 5B is a sectional view taken along line III-III' of FIG. 5A.

FIG. 5A is an exploded perspective view of a display device using second light. FIG. 5B is a sectional view taken along line III-III' of FIG. 5A.

Referring to FIGS. 5A and 5B, the second light 166 emitted from the lamp 122 is reflected by the optical transreflective unit 119, and then provided to the display panel 101 via the light guide plate 130 and the optical sheet 135.

The second light 166 provided to the display panel 101 is changed while second light 166 passes through the display panel 101, so that an image is displayed.

Figure 6:
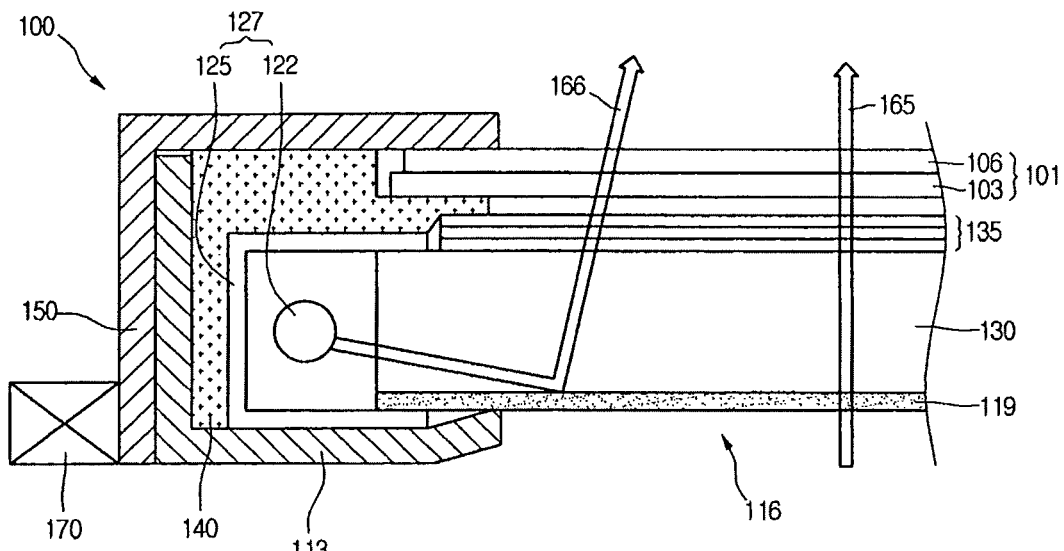
FIG. 6 is a sectional view of a display device according to another embodiment.

FIG. 6 is a sectional view of a display device 100 according to another embodiment.

Description for like elements, which have been described already in the previous embodiment of FIG. 1, will be omitted herein.

Referring to FIG. 6, the display device 100 may include at least one sensor 170 configured to sense light quantity of first light 165 emitted from an external light source such as the sun and an illuminator. The sensor 170 may be attached to a side surface of the top case 150. If the display device is attached to a support member (not shown), e.g., a window of a building, the sensor 170 may be attached to the support member in the vicinity of the side surface of the top case 150. The first light 165 may include natural light generated from the sun or artificial light generated from an illuminator.

According to natural law, the light quantity of the sun is varied with a lapse of time even during a day, for example, varied depending on a time zone such as daybreak, forenoon, afternoon, evening and night. The light quantity of the sun may also be varied momentarily depending on an atmospheric state or whether the sun is obscured by cloud. Further, the light quantity of the sun may differ depending on season or location even at the same time zone. Moreover, the light quantity of the sun may be varied depending on a peripheral condition of the location where the display device is installed, for example, varied depending on whether the installation location is overshadowed by surrounding buildings.

The sensor 170 senses the light quantity of the first light 165 varied with peripheral conditions.

The sensor 170 can also sense the second light 166 emitted from the lamp 122. That is, the sensor 170 can sense both the first light 165 and the second light 166.

Although not shown, the display device 100 may further include a controller configured to control the lamp 122 depending on the light quantity of the sensor 170.

When total light quantity of the first and second light 165 and 166 sensed by the sensor 170 is less than a reference value, the controller controls the lamp 122 to increase the light quantity of the second light 166 emitted from the lamp 122. Therefore, the light quantity of light, i.e., the total light quantity of the first and second light 165 and 166, can be always maintained at the reference value. The reference value may be light quantity or brightness level set in the display panel 101.

When the light quantity of the first light 165 is decreased, the sensor 170 senses the decrease in light quantity so that it may increase the light quantity of the second light 166. Resultingly, it is possible to constantly maintain the total light quantity of the first and second light 165 and 166 provided to the display panel 101.

The sensor 170 mayor may not be operated by a user.

The first light 165, which passes through the opening 116 of the bottom case 113, is incident on the display panel 101 via the optical transreflective unit 119, the light guide plate 130 and the optical sheet 135.

One portion of the second light 166 emitted from the lamp 122 is incident on the display panel 101 as surface light via the light guide plate 130, and the other portion of the second light 166 is reflected by the optical transreflective unit 119 so that it is incident on the display panel 101.

The transmittance of the first and second light 165 and 166 provided to the display panel 101 is changed while the first and second light 165 and 166 pass through the display panel 101, so that an image is displayed.

Figure 7:
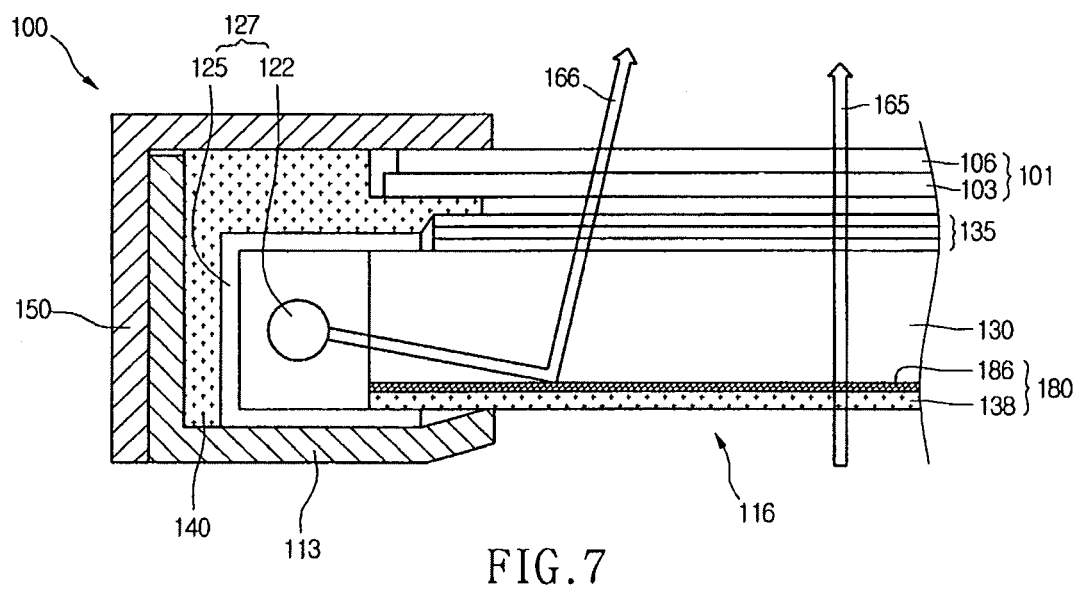
FIG. 7 is a sectional view of a display device according to still another embodiment.

FIG. 7 is a sectional view of a display device according to still another embodiment.

Description for like elements, which have been described already in the previous embodiments of FIGS. 1 and 6, will be omitted herein.

Referring to FIG. 7, an optical transreflective unit 180 includes a diffusion sheet 183 and an optical efficiency enhancement film 186. The optical sheet 183 is in contact with a bottom case 113 and the optical efficiency enhancement film 186 is in contact with a light guide plate 130.

The diffusion sheet 183 is formed of acryl so as to reflect one portion of first light or second light and to transmit the other portion.

The optical efficiency enhancement film 186 may include at least one of a dual brightness enhancement film (DBEF) and a brightness enhancement film (BEF).

The optical efficiency enhancement film 186 transmits one portion of the first light and reflects the other portion. A vibration direction of light reflected by the optical efficiency enhancement film 186 may be coincident with a polarization axis of a first polarization film disposed on a rear surface of the display panel 101.

The first light 165, which passes through the opening 116 of the bottom case 113, passes through the diffusion sheet 183 and the optical efficiency enhancement film 186, and thereafter is provided to the display panel 101 via the light guide plate 130 and the optical sheet 135.

The second light 166 emitted from the lamp 122 is reflected by the diffusion sheet 183 and the optical efficiency enhancement film 186, and then provided to the display panel 101 via the light guide plate 130 and the optical sheet 135. Therefore, if the light quantity of the first light 165 is sufficient, an image can be displayed on the display panel 101 using only the first light 165. Contrariwise, if the light quantity of the first light 165 is not sufficient, an image can be displayed on the display panel 101 using internal light, i.e., the second light 166, emitted from the lamp 122.

Figure 8:
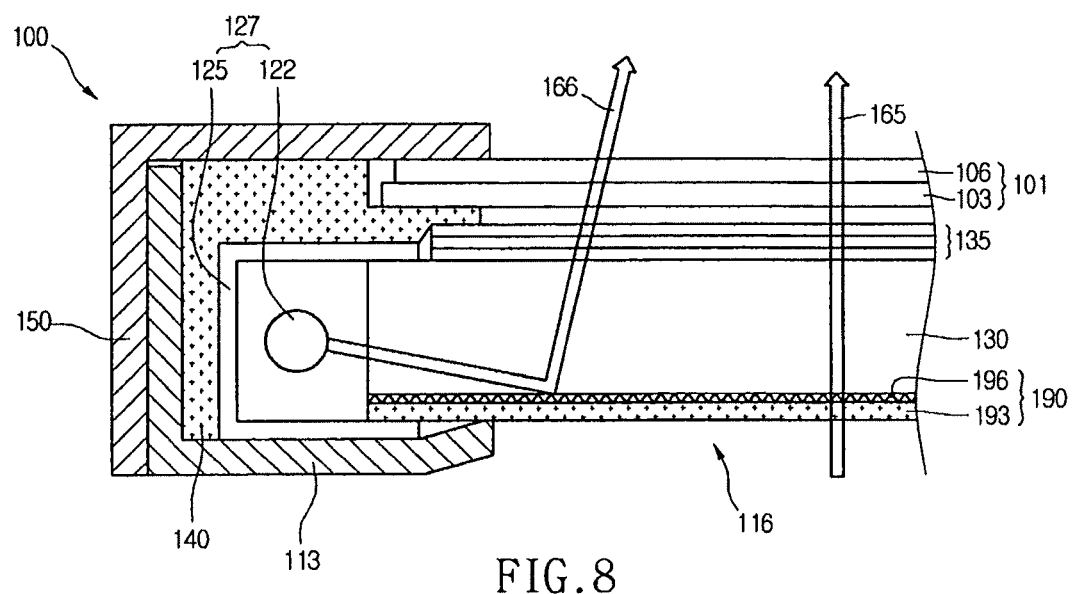
FIG. 8 is a sectional view of a display device according to still another embodiment.

FIG. 8 is a sectional view of a display device 100 according to still another embodiment.

Description for like elements, which have been described already in the foregoing embodiments of FIGS. 1, 6 and 7, will be omitted herein.

Referring to FIG. 8, an optical transreflective unit 190 includes a diffusion sheet 193 and a prism sheet 196. The optical sheet 193 is in contact with a bottom case 113 and the prism sheet 196 is in contact with a light guide plate 130.

The diffusion sheet 193 is formed of acryl so as to reflect one portion of first light or second light and to transmit the other portion.

The prism sheet 196 adjusts a propagation direction of the first and second light 165 and 166. For example, the prism sheet 196 may have prism peaks on one side thereof.

The diffusion sheet 193 and the prism sheet 196 selectively reflect the second light 166 from the second lamp 122 toward the display panel 101, and reflect the first light 165, which passes through an opening 116 of the bottom case 113, toward the display panel 101.

The diffusion sheet 193 may reflect a portion of the second light 166. The prism sheet 196 condenses the randomly reflected second light forwardly, thus improving brightness.

Therefore, if the light quantity of the first light 165 is sufficient, an image can be displayed on the display panel 101 using only the first light 165. Contrariwise, if the light quantity of the first light 165 is not sufficient, an image can be displayed on the display panel 101 using internal light, i.e., the second light 166, emitted from the lamp 122.

Figure 9:
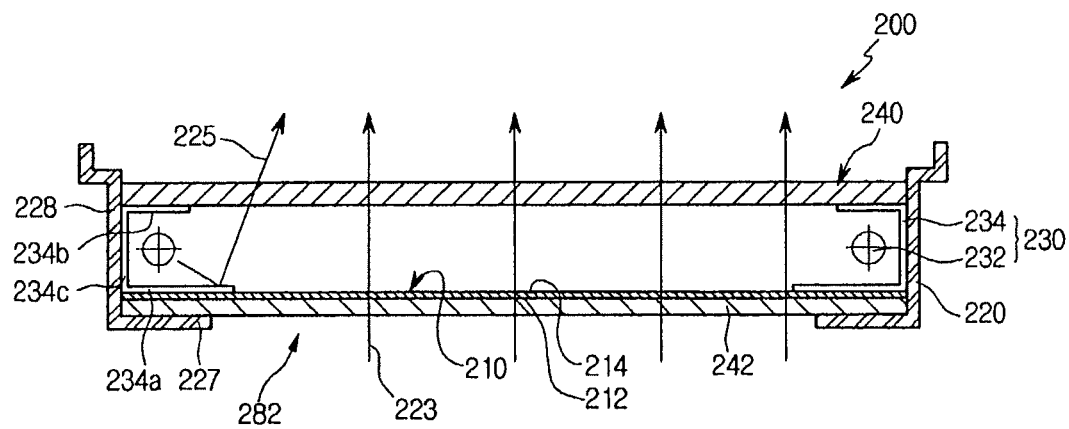
FIG. 9 is a sectional view of a backlight unit according to still another embodiment.

FIG. 9 is a sectional view of a backlight unit 200 according to still another embodiment.

Referring to FIG. 9, the backlight unit 200 includes an optical transreflective unit 210, a diffusion unit 240, a lamp assembly 230 and a bottom case 220.

The optical transreflective unit 210 and the diffusion unit 240 are disposed to face each other. The lamp assembly 230 is disposed at least one side of a region between the optical transreflective unit 210 and the diffusion unit 240.

The optical transreflective unit 210 has the shape of a sheet or a plate. The optical transreflective unit 210 having the shape of a sheet or plate has a first surface 212 and a second surface 214 facing the first surface 212. The second surface 214 of the optical transreflective unit 210 faces the diffusion unit 240.

The first light 223 generated from the sun or an illuminator disposed outside the first surface 212 of the optical transreflective unit 210 passes through the optical transreflective unit 210, and thereafter is provided to the diffusion unit 240. The second light 225 generated from the lamp assembly 230 is reflected by the optical transreflective unit 210, and then provided to the diffusion unit 240. Accordingly, the optical transreflective unit 210 transmits the first light 223 generated from the sun or an illuminator, and reflects the second light 225 generated from the lamp assembly 230. That is, the optical transreflective unit 210 can selectively transmit or reflect the first and second light 223 and 225.

The optical transreflective unit 210 has a relatively small thickness, and thus it is likely to be bended or deformed downwardly so that it may be difficult to achieve a flat surface. For example, if the thickness of the diffusion unit 240 diffusing the first light 223 and/or the second light 225 is about 1 mm or less, the diffusion unit 240 may be bended. If, however, the thickness of the diffusion unit 240 is about 3 mm or more, light transmittance is reduced and the weight of the backlight unit 200 is increased. Therefore, the diffusion unit 240 may have a thickness ranging from about 1 mm to about 3 mm, preferably about 2 mm.

To prevent the optical transreflective unit 210 from being bended, a transparent substrate 242 such as a transparent glass substrate and a transparent synthetic resin substrate, which supports the optical transreflective unit 210, may be disposed on the first surface 212 of the optical transreflective unit 210.

The diffusion unit 240 diffuses the first light 223, which is generated from the sun or an illuminator and passes through the optical transreflective unit 210, and/or the second light 225 generated from the lamp assembly 230. The diffusion unit 240 may be separated from the optical transreflective unit 210 with the lamp assembly 230 interposed therebetween.

The lamp assembly 230 generates the second light 225. In this embodiment, the lamp assembly 230 includes a lamp 232 and a lamp cover 234.

The lamp 232 may include, for example, a cold cathode fluorescence lamp (CCFL). Alternatively, the lamp 232 may include an LED array board with a plurality of LEDs arranged. The lamp 232 may be electrically connected to an inverter (not shown) that supplies a driving voltage to the lamp 232.

The lamp cover 234 condenses the second light generated from the lamp 232 to propagate the condensed second light toward the optical transreflective unit 210 while supporting and receiving the lamp 232. In this embodiment, the lamp cover 234 has a substantially V-shape, and may include brass or a synthetic resin of which light reflectance is substantially similar to that of the brass. The lamp cover 234 includes a first cover 234a, a second cover 234b and a third cover 234c.

The first cover 234a is in contact with and disposed in parallel with the optical transreflective unit 210. The second cover 234b is in contact with and disposed in parallel with the diffusion unit 240. The third cover 234c is connected to both the first and second covers 234a and 234b, and contacts the bottom case 220.

The diffusion unit 240 is disposed on the second cover 234b of the lamp cover 234, and thus the diffusion unit 240 can be supported by the lamp cover 234.

The lamp assembly 230 may be interposed between at least one diffusion unit 240 and the optical transreflective unit 210. The lamp assembly 230 may be provided in plurality between the diffusion unit 240 and the optical transreflective unit 210 such that they face each other. For instance, number of the lamp assembly 230 may be two or four.

The bottom case 220 includes a bottom surface 227 and a sidewall 228. The bottom surface 227 and the sidewall 228 form an internal space in the bottom case 220. In this embodiment, the optical transreflective unit 210, diffusion sheet 240 and the lamp assembly 230 may be received in the internal space of the bottom case 220.

An opening 282 is provided in the bottom surface of the bottom case 220 such that the first light 223 generated from the sun or an illuminator can be provided to the optical transreflective unit 210. Therefore, the opening 282 may be formed in the bottom case 220 except for the bottom surface 227.

Figure 10:
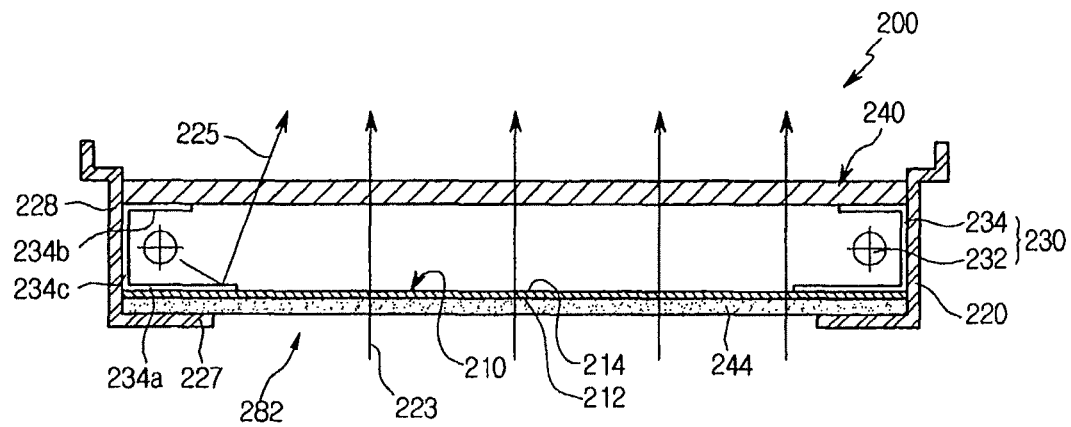
FIG. 10 is a sectional view of a backlight unit according to still another embodiment.

FIG. 10 is a sectional view of a backlight unit 200 according to still another embodiment.

Referring to FIG. 10, the backlight unit 200 includes an optical transreflective unit 210, a first diffusion unit 240, a lamp assembly 230 and a bottom case 220. These elements 210, 240, 230 and 220 have been already described in the previous embodiment of FIG. 9, and thus further description for them will be omitted herein.

The backlight assembly 200 of this embodiment of FIG. 10 may further include a second diffusion unit 244 instead of the transparent substrate (see 230 of FIG. 9) in the previous embodiment of FIG. 9. That is, the second diffusion unit 244 may be disposed to contact the first surface 212 of the optical transreflective unit 210. In other words, the optical transreflective unit 210 may be disposed on the second diffusion unit 244.

The second diffusion unit 244 supports the optical transreflective unit 210 to thereby prevent the optical transreflective unit 210 from being sagged or bended. The second diffusion unit 244 diffuses the first light 223 generated from the sun or an illuminator, thus improving brightness uniformity of the first light 223. In addition, the second diffusion unit 244 can reflect and diffuse the second light 225 generated from the lamp assembly 230.

The second diffusion unit 244 may have a thickness ranging from about 1 mm to about 3 mm, preferably about 2 mm.

The second diffusion unit 244 and the optical transreflective unit 210 may be disposed in parallel with the first diffusion unit 240.

In this embodiment, the second diffusion unit 244, the optical transreflective unit 210, the lamp assembly 230 and the first diffusion unit 240 may be sequentially received in the bottom case 220.

Figure 11:
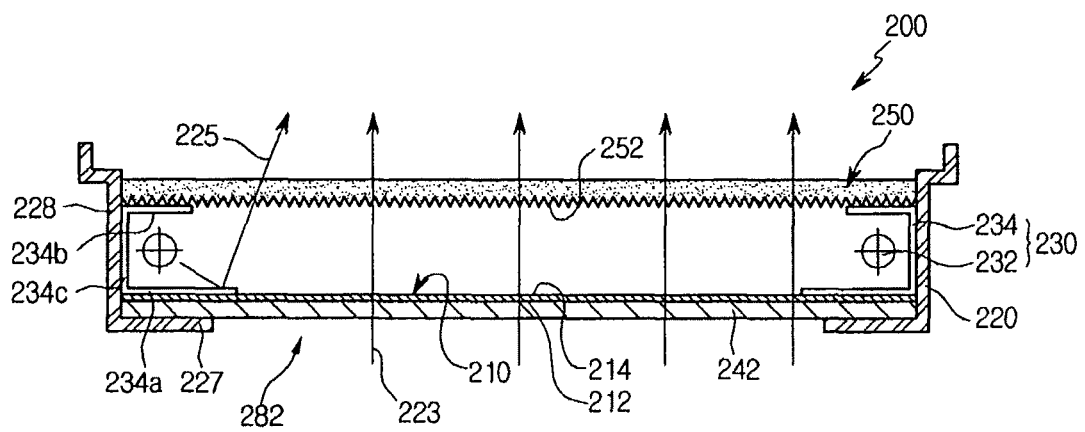
FIG. 11 is a sectional view of a backlight unit according to still another embodiment.

FIG. 11 is a sectional view of a backlight unit 200 according to still another embodiment.

Referring to FIG. 11, the backlight unit 200 includes an optical transreflective unit 210, a transparent substrate 242, a diffusion unit 240, a lamp assembly 230 and a bottom case 220. These optical transreflective unit 210, the diffusion unit 240, the lamp assembly 230 and the bottom case 220 have been already described in the previous embodiment of FIG. 9, and thus further description for them will be omitted herein.

Due to the lamp assembly 230 disposed at a side of the backlight unit 200, the brightness of the second light 225 generated from the lamp assembly 230 becomes lower in a central region of the diffusion unit 250 far away from the lamp assembly 230 than an edge region of the diffusion unit 250. The brightness of the first light 223, which is generated from the sun or an illuminator and provided through an opening 282 of the bottom case 220, is higher in a central region of the opening 282 of the bottom case 220 than an edge region, i.e., the opening 282 adjacent to one end of the bottom surface 227 of the bottom case 220. Such a brightness distribution is similarly applied to the diffusion unit 250. Consequently, this leads to brightness nonuniformity of the first or second light 223 or 225 passing through the diffusion unit 250.

To solve such brightness nonuniformity, in this embodiment of FIG. 11, a plurality of rugged patterns 252 may be disposed on a rear surface of the diffusion unit 250 for improving brightness uniformity.

The rugged pattern 252 may have various shapes. For example, the rugged pattern 252 may have the shape of a triangular pyramid, a quadrangular pyramid or a polypyramid, which protrudes from the diffusion unit 250. The rugged pattern 252 may have a recessed shape from the diffusion unit 250.

For example, all the rugged patterns 252 may have the same size but respective gaps between the rugged patterns 252 may be different from each other. Specifically, the rugged patterns 252 may be equal in size, and may be respectively separated by gaps that progressively differ from a central region of the diffusion unit 250 to an edge region.

Alternatively, all the gaps between the rugged patterns 252 may be equal to each other, but the respective rugged surfaces 252 may have different sizes. Specifically, the rugged patterns 252 may be respectively separated by an equal gap, and may progressively differ in size from a central region of the diffusion unit 250 to an edge region.

Figure 12:
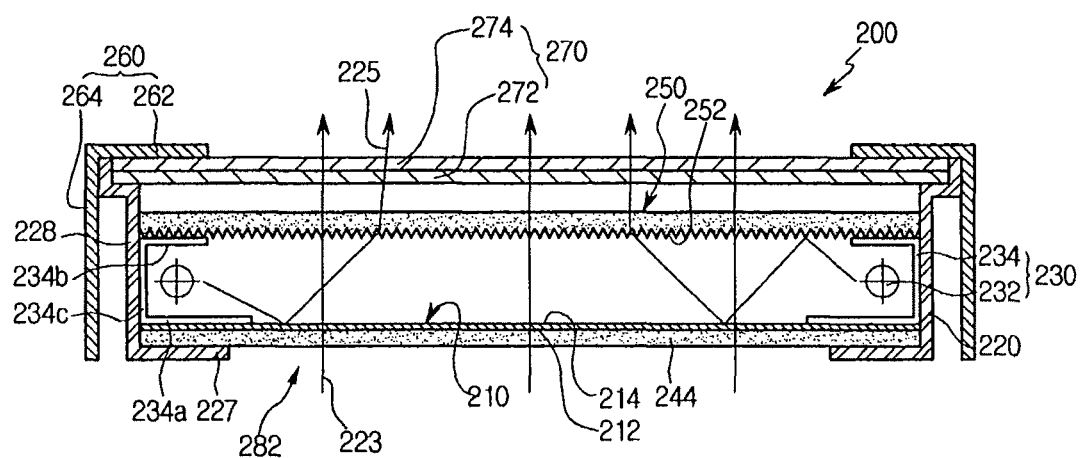
FIG. 12 is a sectional view of a display device including a backlight unit according to still another embodiment.

FIG. 12 is a sectional view of a display device including a backlight unit 200 according to still another embodiment.

Referring to FIG. 12, the display device includes the backlight unit 200, a display panel 270 and a top case 260.

The display panel 270 is received in a bottom case 220 of the backlight unit 200. The top case 260 is fixedly coupled to the bottom case 220 so as to prevent the display panel 270 from being separated from the bottom case 220.

The backlight unit 200 includes an optical transreflective unit 210, a first diffusion unit 250 having the rugged patterns 252, a second diffusion unit 244, a lamp assembly 230 and a bottom case 220. These elements 210, 250, 244, 222 and 220 have been described already, and thus further description for them will be omitted herein.

The backlight unit 200 of this embodiment in FIG. 12, however, differs from the backlight unit of the previous embodiment of FIG. 9 in that the plurality of rugged patterns 252 are provided on the first diffusion unit 250 in comparison with the diffusion unit (see 240 of FIG. 9) of the previous embodiment of FIG. 9 and the second diffusion unit 244 is provided instead of the transparent substrate of the previous embodiment of FIG. 9. The backlight unit 200 of this embodiment in FIG. 12 also differs from the backlight unit of the previous embodiment of FIG. 10 in that the plurality of rugged patterns 252 are provided on the first diffusion unit 250 in comparison with the diffusion unit (see 240 of FIG. 10) of the previous embodiment of FIG. 10. The backlight unit 200 of this embodiment in FIG. 12 also differs from the backlight unit of the previous embodiment of FIG. 11 in that the second diffusion unit 244 is provided instead of the transparent substrate of the previous embodiment of FIG. 11.

The backlight unit according to the previous embodiments of FIGS. 9 to 11 may also be employed in a display device instead of the backlight 200 of this embodiment in FIG. 12.

Figure 13:
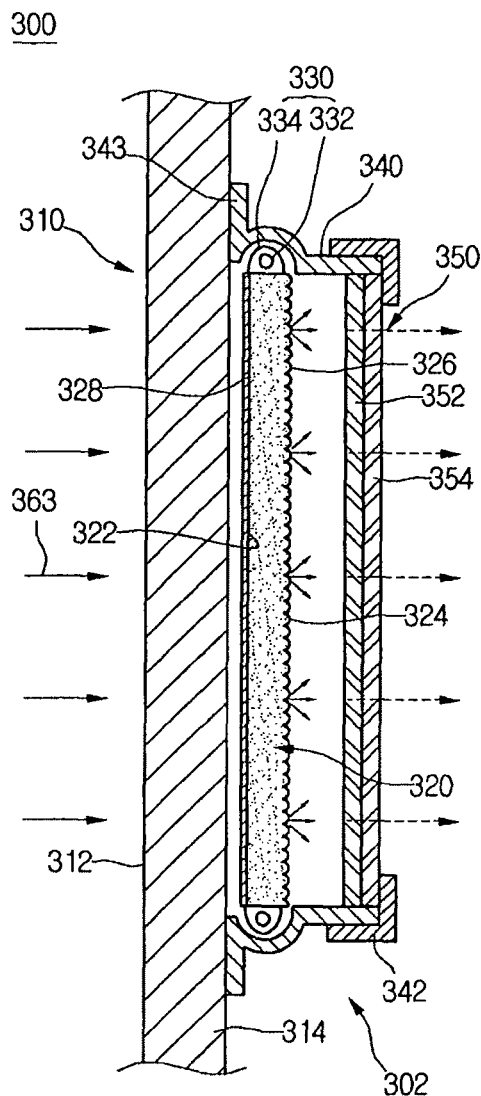
FIG. 13 is a sectional view of a display device according to still another embodiment.

FIG. 13 is a sectional view of a display device 300 according to still another embodiment.

Referring to FIG. 13, the display device 300 includes a support member 310 and a display module 302.

The support member 301 supports the display module 302. In this embodiment of FIG. 13, the support member 310 may include a transparent substrate having a first surface 312 and a second surface 314. For example, the support member 310 may be a window that is capable of transmitting first light 363 generated from the sun or an illuminator to the second surface 314 from the first surface 312. The support member 310 may be a window installed in a building.

The display module 302 may be disposed on the second surface 314 of the support member 310. Therefore, the first light 363 generated from the sun or an illuminator passes through the support member 310 and thus provided to the display module 302. The display module 302 may be attached to the support member 310 using an adhesive member (not shown). For example, the adhesive member is applied between the support member 310 and the bottom surface 343 of the bottom case 340 corresponding to the support member 310, and the support member 310 and the bottom surface 343 of the bottom case 340 are then pressurized, so that the display module 302 can be attached to the support member 310.

The display module 302 includes a backlight unit, a display panel 350 and a top case 342.

The backlight unit may include an optical transreflective unit 328, a diffusion unit 320, a lamp assembly 330 and a bottom case 340.

The lamp assembly 330 includes a lamp 332 and a lamp cover 334. The lamp 332 generates second light. One portion of the second light generated from the lamp 332 is directly provided to the optical transreflective unit 328, and the other portion is reflected by the lamp cover 334 and then provided to the optical transreflective unit 328. The lamp assembly 330 may be disposed at one side, two opposite sides or all the sides of the display module 302.

The lamp assembly 330 may be fixedly coupled to the bottom case 340. The lamp assembly 330 has been described already, and thus further description for it will be omitted herein.

The optical transreflective unit 328 may have the shape of, for example, a rectangular plate. The optical transreflective unit 328 may be disposed on the same plane with the lamp assembly 330 in a side direction. The optical transreflective unit 328 transmits the first light 363, which is generated from the sun or an illuminator and passes through the support member 310, and reflects the second light generated from the lamp assembly 330 toward the display panel 350 in the front.

The diffusion unit 320 transmits and scatters the first light 363 passing through the support member 310, thus preventing external background of the support member 310 from being displayed on the display module 302. The diffusion unit 320 may have a size equal to or greater by about 1.5 times than that of the display panel 350.

In order to prevent the diffusion unit 320 from being discolored due to ultraviolet (UV) light contained in the first light 363 passing through the support member 310, the diffusion unit 320 may be formed of glass that is not discolored by UV light. Alternatively, the diffusion unit 320 may be formed of synthetic resin that is not discolored by UV light contained in the first light 363. Alternatively, a UV blocking film may be further provided on the diffusion unit 320 so as to prevent the discoloration of the diffusion unit 320.

The diffusion unit 320 includes a first surface 322 and a second surface 324 facing the first surface 322. The first surface 322 of the diffusion unit 320 is in contact with the second surface 314 of the support member 310, and a second surface 324 of the diffusion unit 320 is disposed to face the display panel 350.

Optical diffusion patterns 326 are disposed on the second surface 324 of the diffusion unit 320. The optical diffusion patterns 326 diffuse the first light 363 or the second light incident on the diffusion unit 320. The optical diffusion patterns 326 of the diffusion unit 320 may be formed by etching the second surface 324 of the diffusion unit 320 using etchant such as hydrogen fluoride (HF).

To improve the optical diffusion efficiency of the diffusion unit 320, the first surface 322 of the diffusion unit 320 and the second surface 314 of the support member 310 may be separated from each other by a distance ranging from about 0.5 mm to about 100 mm. In addition, to improve the optical diffusion efficiency of the diffusion unit 320, the second surface 322 of the diffusion unit 320 and the display panel may be separated from each other by a distance ranging from about 0.5 mm to about 50 mm.

The second light generated from the lamp assembly 330 may diffuse by the optical diffusion patterns 326 provided on the second surface 324 of the diffusion unit 320, and is also emitted toward the first surface 322. The second light emitted toward the first surface 322 of the diffusion unit 320 is lost. In order to prevent such a loss, the optical transreflective unit 328 may be disposed on a rear surface of the diffusion unit 320. The optical transreflective unit 328 may transmit the first light 363, which is generated from the sun or an illuminator and passes through the support member 310, to provide the transmitted first light 363 to the display panel 350 while the optical transreflective unit 328 reflects the second light generated from the lamp assembly 330 to provide the reflected second light to the display panel 350.

The optical transreflective unit 326 and the diffusion unit 320 may be fixed to the lamp assembly 330, particularly the lamp cover 334 or a separate support member (not shown).

The display panel 350 displays an image using the first light 363 generated from the sun or an illuminator or the second light generated from the lamp assembly 330. The display panel 350 includes a first substrate, a second substrate and a liquid crystal layer interposed therebetween. The display panel 350 may be fixed to the bottom case 340. The display panel 350 has been described already, and thus further description for it will be omitted herein.

Therefore, the optical transreflective unit 328, the diffusion unit 320, the lamp assembly 330 and the display panel 350 are disposed in the bottom case 340. The lamp assembly 330 and the display panel 350 may be fixed to the bottom case 340, and the optical transreflective unit 328 and the diffusion unit 320 may be fixed to the lamp assembly 330.

In this embodiment of FIG. 13, it is difficult to fix the display module to the support member directly only using the aforesaid adhesive member because the display module 302 is too heavy. Accordingly, a ring is connected to the bottom surface 343 of the bottom case 340, a wire is then connected to the ring, and the wire is fixed to a ceiling. In the case where the display module 302 is fixed to the support member 310 in the vicinity of the ceiling, the ring of the display module 302 may be directly fixed to a hooking protrusion provided in the ceiling without a wire.

An opening may be provided in the bottom case 340 adjacent to the support member 310 to provide the first light 363 passing through the support member 310 to the optical transreflective unit 328. Therefore, the bottom case 340 may have the same shape and size as the display panel, and it has an internal space therein. The optical transreflective unit 328, the diffusion unit 320 and the display panel 350 may be disposed in the internal space of the bottom case 340. The bottom case 340 may have the bottom surface 343 adjacent to the support member 310 so that it is fixed to the support member 310 using an adhesive member.

In the daytime, the display device 300 of this embodiment displays an image using the first light 363 which is generated from the sun and passes through the support member 310. Therefore, it is possible to considerably reduce power consumption by displaying an image using the first light 363 with excellent brightness and brightness uniformity.

The first light 363 generated from the sun passes through the diffusion unit 328 after passing through the support member 310. Thereafter, the first light 363 is diffused by the optical diffusion pattern 326 and then provided to the display panel 350, so that the display panel 350 can display an image.

In the nighttime, the display device 300 of this embodiment displays an image using the second light 363 generated from the lamp assembly 330.

Figure 14:
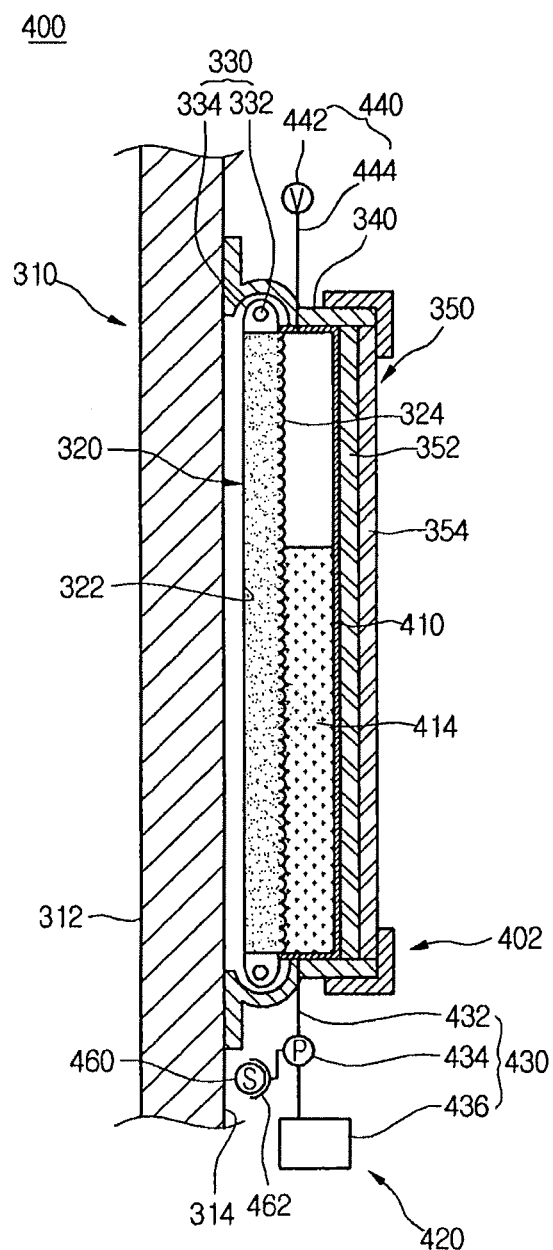
FIG. 14 is a sectional view of a display device according to still another embodiment.

FIG. 14 is a sectional view of a display device 400 according to still another embodiment.

The display device 400 of this embodiment in FIG. 14 is substantially the same as the display device of the previous embodiment of FIG. 13 except for a refractive index control unit 420, a cover 410 and a fluid 414 filled into the cover 410. Hence, description for like elements, which have been described already in the previous embodiment of FIG. 13, will be omitted herein. Also, like reference numerals and designations disclosed herein denote like elements illustrated in the previous embodiment of FIG. 13.

Referring to FIG. 14, the display device 400 includes a support member 310, a refractive index control unit 420 and a display module 402.

The display module 402 includes a backlight unit, a display panel 350 and a top case 342.

The backlight unit may include a diffusion unit 320, a lamp assembly 330 and a bottom case 340.

Figure 15:
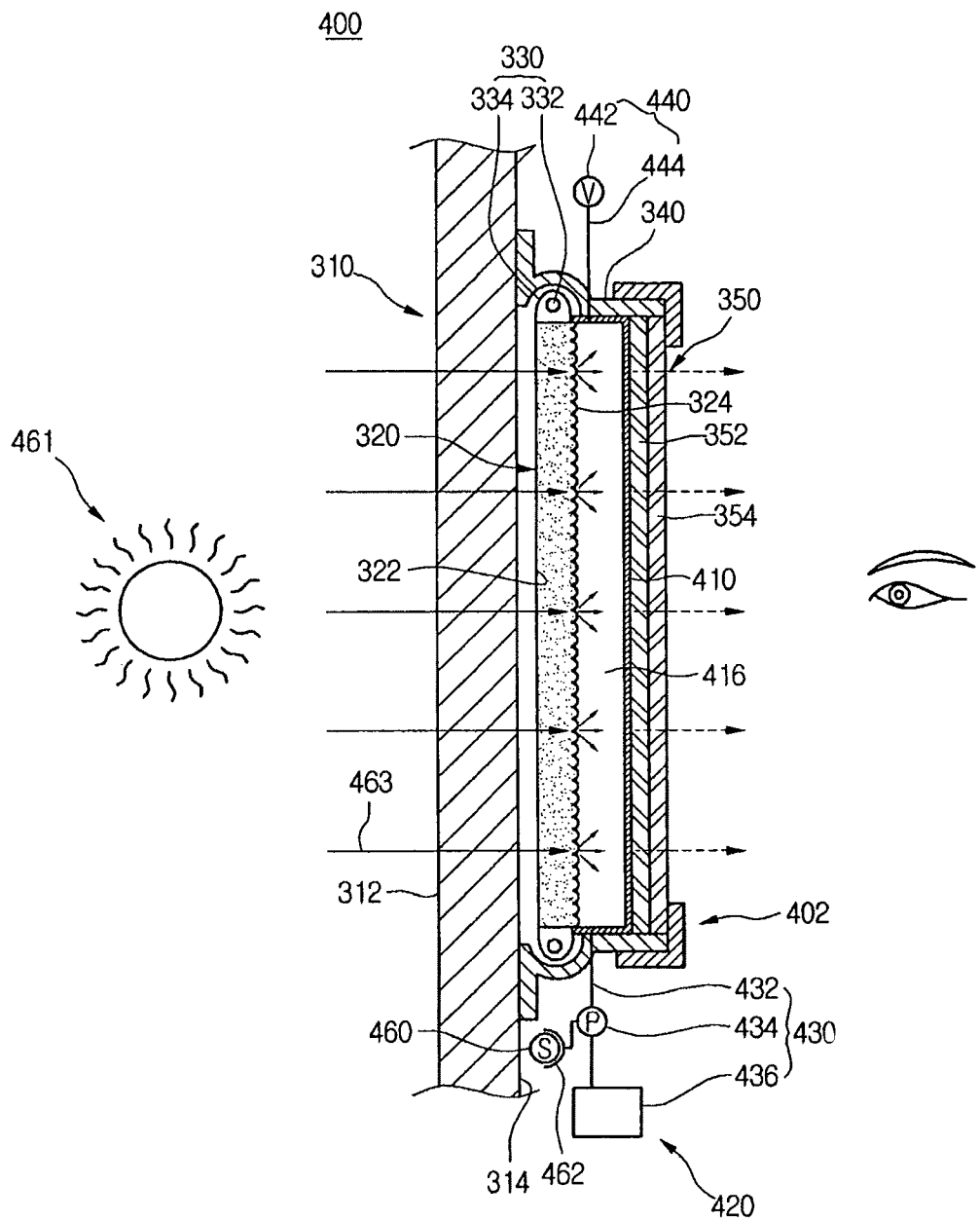
FIG. 15 is a sectional view illustrating operation of the display device of FIG. 14 in a day mode.
Figure 16:
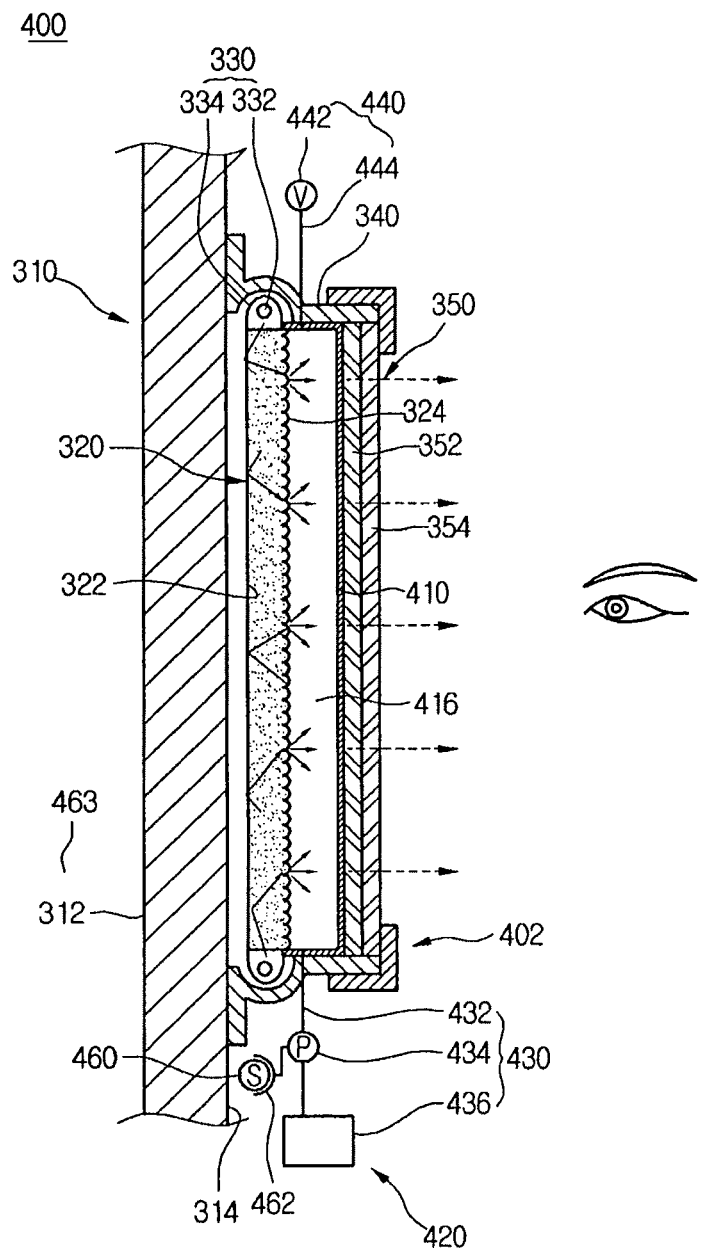
FIG. 16 is a sectional view illustrating operation of the display device of FIG. 14 in a night mode.
Figure 17:
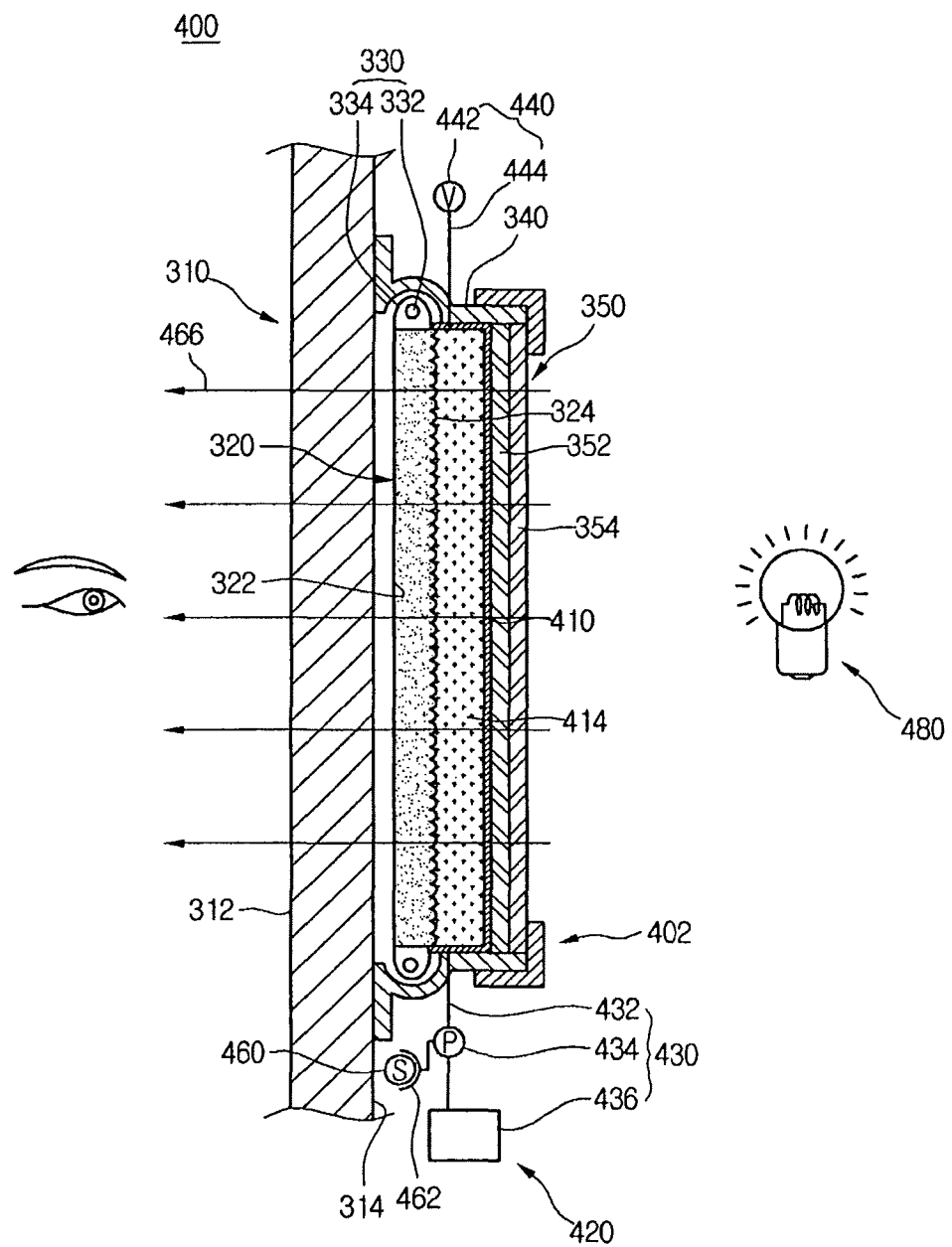
FIG. 17 is a sectional view illustrating operation of the display device of FIG. 14 in a night advertisement mode.

The refractive index control unit 420 controls a propagation direction of light to display an image on both sides of the display panel 350. That is, as illustrated in FIGS. 15 and 16, first light 464 generated from the sun or an illuminator or second light generated from the lamp assembly 330 must be provided to the display panel 350 in order that a user may see an image indoors. On the contrary, as illustrated in FIG. 17, third light 466 generated from an indoor illuminator must be provided to the display panel 350 in order that a user may see an image on the display panel 350 outdoors. The third light having brightness passing through the display panel 350 must be provided to an outdoor user through the support member 310. To this end, the refractive index control unit 420 controls propagation paths of the first and second light or a propagation path of the third light.

The refractive index control unit 420 suppresses optical diffusion function by the optical diffusion pattern of the diffusion unit 320 to thereby control an image to be selectively displayed indoors or outdoors with respect to the support member 310.

For example, the display device 400 displays an image indoors using the first light 463 generated from the sun or an illuminator in the daytime. In addition, the display device 400 displays an image outdoors using the third light 466 generated from the indoor illuminator in the nighttime.

The refractive index control unit 420 may include a cover 410, a fluid controller 430, an air controller 440 and an optical sensor 460.

The cover 410 is provided between the diffusion unit 320 and the display panel 350. That is, the cover 410 is disposed to surround a rear surface of the display panel 350 and a side surface of the bottom case 340 between the diffusion unit 320 and the display panel 350. This configuration of the cover 410 and the diffusion unit 320 form an internal space. A distance between the diffusion unit 320 and the cover 410 contacting the display panel 350 may be in the range of about 0.5 mm to about 5 mm.

The internal space of the cover 410 may be filled with air or a fluid 414 under control of the fluid controller 350 or the air controller 440.

The fluid 414 may have the same optical refractive index as the diffusion unit 320. For example, the fluid 414 may include oil.

If the cover 410 is filled with air, the diffusion unit 320 diffuses the first light generated from the sun or an outdoor illuminator or the second light generated from the lamp assembly 330.

Contrariwise, if the cover 410 is filled with the fluid 414, the diffusion unit 320 does not diffuse the third light that is generated from the indoor illuminator and passes through the display panel 350, but transmits the third light. The reason the diffusion unit 320 transmits the third light is that the diffusion unit 320 has refractive index substantially equal to that of the fluid 414 filled into the cover 410.

Air may be filled into the internal space provided between the diffusion unit 320 and the cover 410 under control of the air controller 440.

The air controller 440 includes an air port 444 and an air opening/closing valve 442. The air port 444 penetrates one side of the bottom case 340 and the cover 410 to be in contact with the internal space formed by the diffusion unit 320 and the cover 410. The air opening/closing valve 442 is connected to the air port 444 to open/close the injection of air. Although not shown, the air controller 440 may further include an air storage tank, which is connected to the air opening/closing valve 442 and stores air. The air opening/closing valve 442 may include a solenoid valve operated by an electrical signal.

When the air opening/closing valve 442 is opened, the air stored in the air storage tank is injected into an internal space via the air port 444, or the air existing in the internal space may be pushed by the fluid 414 forcibly filled into the internal space and then stored in the air storage tank.

The fluid controller 430 includes a fluid port 432, a fluid pump 434 and a fluid storage tank 436. The fluid port 432 penetrates the other sides of the bottom case 340 and the cover 410 to be in contact with the internal space formed by the diffusion unit 320 and the cover 410. The fluid pump 434 is connected to the fluid port 432 and forcibly injects the fluid 414 into the internal space via the fluid port 432. The fluid storage tank 436 is connected to the fluid pump 434 and stores the fluid 414.

The fluid 414 may be forcibly filled into the internal space by the fluid pump 434, or the fluid 414 existing in the internal space may be stored in the fluid storage tank 436. That is, when the fluid pump 434 operates forwardly, the fluid 414 stored in the fluid store tank 436 may be forcibly filled into the internal space via the fluid port 432. At this point, the opening/closing valve 442 is opened so that the air existing in the internal space may be stored in the air storage tank via the air port 444. When the fluid pump 434 operates backwardly, the fluid 414 existing in the internal space may be forcibly stored in the fluid storage tank 436 via the fluid port 432. At this point, the opening/closing valve 442 is opened so that the air stored in the air storage tank may be filled into the internal space via the air port 444.

The optical sensor 460 senses the first light generated from the sun or an outdoor illuminator. Although not shown, a controller may be disposed between the optical sensor 460 and the fluid pump 434. The opening/closing valve 442, the fluid pump 434 and the lamp assembly 330 may be controlled by the controller.

The controller may control the opening/closing valve 442 and the fluid pump 434 depending on a day mode, a night mode or a night advertisement mode, which is selected on the basis of the intensity of the first light sensed by the optical sensor 460.

FIG. 15 is a sectional view illustrating operation of the display device of FIG. 14 in a day mode.

Referring to FIG. 15, the controller senses the intensity of the first light such as the sunlight, which is incident from the optical sensor 460. If the sensed intensity of the first light 463 is a reference level or higher, the opening/closing valve 442 is opened and the fluid pump 434 operates backwardly. Accordingly, the fluid 414 existing in the internal space between the diffusion unit 320 and the cover 410 is stored in the fluid storage tank 436 via the fluid port 432. According as the fluid 414 is discharged from the internal space, the air stored in the air storage tank may be filled into the internal space via the opening/closing valve 442 ad the air port 444.

In this case, the first light 463 generated from the sunlight 461 is provided to the diffusion unit 320 via the support member 310, and is diffused by the diffusion unit 320. Thereafter, the diffused first light 463 may be provided to the display panel 350 via the internal space between the diffusion unit 320 and the cover 410. The display panel 350 displays an image to an indoor user using the first light 463.

FIG. 16 is a sectional view illustrating operation of the display device of FIG. 14 in a night mode.

Referring to FIG. 16, the controller senses the intensity of the first light such as the sunlight, which is incident from the optical sensor 460. When the sensed intensity of the first light is less than the reference level and the night advertisement mode is not selected, the opening/closing valve 442 is opened so that the fluid pump 434 operates backwardly. Accordingly, the fluid 414 existing in the internal space between the diffusion unit 320 and the cover 410 is stored in the fluid storage tank 436 via the fluid port 432. Accordingly as the fluid 414 is discharged from the internal space, the air stored in the air storage tank may be filled into the internal space via the opening/closing valve 442 and the air port 444.

In this case, the controller drives the lamp assembly 330 to generate the second light from the lamp 332. The second light is incident on the side surface of the diffusion unit 320 and then diffused by the optical diffusion patterns. Thereafter, the diffused second light may be provided to the display panel 350 via the internal space filled with air 461 between the diffusion unit 320 and the cover 410. The display panel 350 displays an image to an indoor user using the second light 463.

FIG. 17 is a sectional view illustrating operation of the display device of FIG. 14 in a night advertisement mode.

Referring to FIG. 17, the controller senses the intensity of the first light such as the sunlight, which is incident from the optical sensor 460. When the sensed intensity of the first light is less than the reference level and the night advertisement mode is selected, the opening/closing valve 442 is opened so that the fluid pump 434 operates forwardly. Accordingly, the fluid 414 of the fluid storage tank 436 is filled into the internal space between the diffusion unit 320 and the cover 410. Further, the air existing in the internal space is stored in the air storage tank via the air port 444 and the opening/closing valve 442. The controller stops operation of the lamp assembly 330 so that the second light is not generated.

In this case, the third light generated from an indoor illuminator is incident on the display panel 350, and converted into an image by the display panel 350. The converted image is displayed to an outdoor user via the fluid 441 in the internal space, the diffusion unit 320 and the support member 310.

When the display device operates in the night advertisement mode, the display device inverts an image, and thus an outdoor user can see a correct image.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
    a case having an opening;
    at least one lamp assembly on a side surface of the case, the at least one lamp assembly comprising a light source;
    a diffusion unit on the case;
    a cover on the diffusion unit for forming an internal space in the diffusion unit;
    a first controller controlling air to be supplied into the internal space; and
    a second controller controlling fluid to be supplied into the internal space.

2. The backlight unit according to claim 1, further comprising an optical sensor sensing first light passing through the opening of the case.

3. The backlight unit according to claim 2, wherein air is filled into the internal space under control of the first and second controllers when intensity of the first light is a reference value or higher and a night advertisement mode is unselected.

4. The backlight unit according to claim 2, wherein air is filled into the internal space under control of the first and second controllers and second light is generated when intensity of the first light is smaller than a reference value and a night advertisement mode is unselected.

5. The backlight unit according to claim 2, wherein fluid is filled into the internal space under control of the first and second controllers when intensity of the first light is smaller than a reference value and a night advertisement mode is selected.

6. The backlight unit according to claim 1, wherein the cover and the diffusion unit are separated from each other by a distance ranging from 0.5 mm to 5 mm.

7. The backlight unit according to claim 1, wherein the fluid has a refractive index equal to that of the diffusion unit.

8. The backlight unit according to claim 7, wherein the fluid includes oil.

9. A display device comprising:
    a display panel; and
    a backlight unit providing light to the display panel,
        the backlight unit comprising:
        a first case having an opening;
        at least one lamp assembly on a side surface of the first case, the at least one lamp assembly comprising a light source;
        a diffusion unit on the first case;
        a cover on the diffusion unit for forming an internal space in the diffusion unit;
        a first controller controlling air to be supplied into the internal space; and
        a second controller controlling fluid to be supplied into the internal space.

10. The display device according to claim 9, further comprising:
    a second case coupled to the first case to surround the display panel; and
    a support member attached to the first case.

* * * * *